United States Patent
Lee et al.

(10) Patent No.: US 8,557,114 B2
(45) Date of Patent: Oct. 15, 2013

(54) WATER PURIFICATION APPARATUS AND METHOD FOR USING PRESSURE FILTER AND PORE CONTROL FIBER FILTER

(75) Inventors: Eui-Sin Lee, Yongin-si (KR); Bum-Goo Lee, Seoul (KR); Hee-Kyong Oh, Suwon-si (KR); Jung-Yeol Eom, Suwon-si (KR)

(73) Assignee: Daewoo E&C Co., Ltd., Seoul (KR)

( * ) Notice: Subject to any disclaimer, the term of this patent is extended or adjusted under 35 U.S.C. 154(b) by 569 days.

(21) Appl. No.: 12/760,637

(22) Filed: Apr. 15, 2010

(65) Prior Publication Data
US 2011/0000849 A1   Jan. 6, 2011

(30) Foreign Application Priority Data
Apr. 28, 2009   (KR) ......................... 10-2009-0037174

(51) Int. Cl.
*B01D 29/00* (2006.01)
*C02F 9/00* (2006.01)
*C02F 9/02* (2006.01)
*C02F 9/04* (2006.01)
*C02F 1/52* (2006.01)

(52) U.S. Cl.
USPC ......... 210/257.1; 210/260; 210/319; 210/295

(58) Field of Classification Search
None
See application file for complete search history.

(56) References Cited

U.S. PATENT DOCUMENTS

| | | | | |
|---|---|---|---|---|
| 3,577,341 A | * | 5/1971 | Keith et al. | 210/712 |
| 3,786,924 A | * | 1/1974 | Huffman | 210/257.2 |
| 3,792,773 A | * | 2/1974 | Ross | 210/712 |
| 3,977,970 A | * | 8/1976 | Willis et al. | 210/703 |
| 4,054,517 A | * | 10/1977 | Feltz et al. | 210/710 |
| 4,366,063 A | * | 12/1982 | O'Connor | 210/652 |
| 5,997,745 A | * | 12/1999 | Tonelli et al. | 210/652 |
| 2009/0107915 A1 | * | 4/2009 | Skinner et al. | 210/636 |

* cited by examiner

Primary Examiner — Katherine Zalasky
(74) Attorney, Agent, or Firm — Kile Park Reed & Houtteman PLLC

(57) ABSTRACT

The present invention provides a water purification apparatus and method using a pressurized micro-filter preprocessed with a coagulation inclined-plate sedimentation reservoir and a pore-control fiber filter for improvement of a recovery rate, which removes the dissolved organic materials and the turbidity of raw water through a preprocess by a flash mixer, a two-stage coagulation reservoir and an inclined-plate sedimentation reservoir, thereby making it possible to reduce the use of coagulants, the generation of sludge by-products, the inflow load of membranes, and the facility size in comparison with the conventional standard water purification processes.

5 Claims, 4 Drawing Sheets

WATER PURIFICATION APPARATUS AND METHOD FOR USING PRESSURE FILTER AND PORE CONTROL FIBER FILTER

BACKGROUND OF THE INVENTION

1. Field of the Invention

The present invention relates to a water purification apparatus and method. In particular, the present invention relates to a water purification apparatus and method using a pressurized micro-filter preprocessed with a coagulation inclined-plate sedimentation reservoir and a pore-control fiber filter for improvement of a recovery rate, which can reduce the pollution load of the pressurized micro-filter through a preprocess by a flash mixer, a two-stage coagulation reservoir and an inclined-plate sedimentation reservoir and can improve the recovery rate by using the pore-control fiber filter to recover backwash wastewater discharged from the pressurized micro-filter.

2. Description of the Related Art

World-wide attention is being focused on water due to the lack of water caused by global warming, industrialization and population growth, the water infrastructure degeneration of advanced countries, and the deterioration of water quality caused by the advance of industrialization of developing countries. The world-wide water industry is expected to grow at an annual rate of 5% on average and reach a market size of 0.3 trillion dollars in 2010, and the structural change, the growth acceleration, the internationalization and the opening of the water industry are now in progress. The multinational water companies have made inroads into the water markets of developing countries including China. However, due to the high entry barriers in the service businesses and the water supply and drainage facilities, the domestic water companies have difficulty in entering the world-wide water market. Economical scale, high and specialized technology, efficient service, and total solution technology are required to compete with the water companies that preoccupies the existing water market.

The domestic water market encounters various problems such as the reinforcement of drinking water quality standards, the formation of new water paradigms, the limited process efficiency of conventional water treatment processes, the degeneration of facilities, and the need for specialized service management systems. What is therefore required is the next-generation environment-friendly water treatment technology that can graft newly developable future technology onto the conventional technology, an example of which is a membrane-based water purification system.

A membrane-based filtration technology can effectively remove target materials by the definite size of pore. Due to its excellent capability of removing pathogenic microorganisms, the membrane-based filtration technology can replace the conventional mixing, coagulation, sedimentation and sand filtration processes through only a single membrane-filtration process.

Also, the modularizing, skidding and packaging of membrane facilitates the installation, improvement and extension of facilities, thus making it possible to reduce the construction period and facilitate the combination with a single water treatment process. Also, it enables the automation of a membrane filtration system in the places lacking specialists, such as small-scale water purification plants and village waterworks, thus making it possible to attempt the integrated operation management.

In addition, the use of the membrane-based filtration technology enables minimization of an occupation area, reduction of a coagulant injection amount, reduction of a sludge generation amount, efficient use of energy, and high process speed, and thus it can be considered as the next-generation environment-friendly water treatment process.

However, technology is insufficient to effectively control a water purification process based on membrane-based filtration technology, due to the unfavourable conditions of inflow water such as the high turbidity level, the low water temperature and the large alga population number caused by the characteristics of water sources for domestic water purification plants.

Also, various process methods are being considered to improve a recovery rate for preservation of water resources, but there is a need for research on wastewater treatment technology suitable for the domestic situations.

SUMMARY OF THE INVENTION

The present invention provides a water purification apparatus and method using a pressurized micro-filter preprocessed with a coagulation inclined-plate sedimentation reservoir and a pore-control fiber filter for improvement of a recovery rate, which removes the dissolved organic materials and the turbidity of raw water through a preprocess by a flash mixer, a two-stage coagulation reservoir and an inclined-plate sedimentation reservoir, thereby making it possible to reduce the use of coagulants, the generation of sludge by-products, the inflow load of membranes, and the facility size in comparison with the conventional standard water purification processes.

The present invention also provides a water purification apparatus and method using a pressurized micro-filter preprocessed with a coagulation inclined-plate sedimentation reservoir and a pore-control fiber filter for improvement of a recovery rate, which uses a pressurized micro-filter with a constant pore size to effectively remove granular materials, chlorine-resistant pathogenic microorganisms (e.g., *Cryptosporidium* and *Giardia*), and algae, thereby making it possible to produce stable water.

The present invention also provides a water purification apparatus and method using a pressurized micro-filter preprocessed with a coagulation inclined-plate sedimentation reservoir and a pore-control fiber filter for improvement of a recovery rate, which uses the pore-control fiber filter to recover backwash wastewater discharged from the pressurized micro-filter, thereby making it possible to maximize the recovery rate and preserve water resources.

The present invention also provides a water purification apparatus and method using a pressurized micro-filter preprocessed with a coagulation inclined-plate sedimentation reservoir and a pore-control fiber filter for improvement of a recovery rate, which continuously monitors each process, thereby making it possible to always control the system operation states.

According to an aspect of the present invention, there is provided a water purification apparatus that uses a pressurized micro-filter preprocessed with a coagulation inclined-plate sedimentation reservoir and a pore-control fiber filter for improvement of a recovery rate, the water purification apparatus including: a raw water storage reservoir for maintaining a constant raw water amount by stabilizing the water level of inflow raw water; a flash mixer for creating micro-flocs through electrical neutralization and adsorption by rapidly reacting injected coagulants with pollutants contained in outflow water from the raw water storage reservoir; a two-stage coagulation reservoir including a first agitator for growing the micro-flocs in the outflow water from the flash mixer to flocs with a filterable and sedimentable size; an inclined-plate sedimentation reservoir equipped with a fin inclined plate for separation by surface loading and separation by turbulence, to sediment the flocks in the outflow water from the two-stage coagulation reservoir and to discharge only upper clean water; a membrane-filtration inflow raw water reservoir for maintaining a constant outflow water amount by stabilizing the water level of the outflow water from the inclined-plate sedimentation reservoir; a pressurized micro-filter for receiving/filtering the outflow water from the membrane-filtration inflow raw water reservoir, discharging membrane-filtration produced water, and returning circulating water to the front end of the flash mixer; a backwash water reservoir for maintaining a outflow water amount by stabilizing the water level of membrane-filtration produced water from the pressurized micro-filter and providing backwash water to the pressurized micro-filter; a processing reservoir for discharging the membrane-filtration produced water to a clear well of a water purification plant while maintaining the outflow water amount by stabilizing the water level of the outflow water from the backwash water reservoir; a backwash wastewater recovery reservoir for recovering the backwash wastewater from the pressurized micro-filter and including a second agitator to prevent the sedimentation of sludge contained in the backwash water; a flow channel switch unit for selectively supplying the backwash water of the backwash wastewater recovery reservoir through first and second pipes according to an external control; a pore-control fiber filter for receiving the backwash wastewater from the backwash wastewater recovery reservoir through the first pipe of the flow channel switch unit, filtering the same, and returning the fiber-filtration water to the front end of the flash mixer; a discharge sludge wastewater reservoir for discharging the backwash wastewater from the pore-control fiber filter and the discharge sludge from the inclined-plate sedimentation reservoir; and a control panel for controlling the flow channel switch unit according to the raw water quality factors of the raw water storage reservoir to supply the outflow water of the backwash wastewater recovery reservoir to the pore-control fiber filter or to return the same to the raw water storage reservoir, and monitoring the coagulant injection amount into the flash mixer, the agitation intensity of the first agitator of the two-stage coagulation reservoir, and the agitation intensity of the second agitator of the backwash wastewater recovery reservoir, the chemical injection amount, and the operation state of the pressurized micro-filter.

The flash mixer may further include: an on-line measurer for measuring in real time the raw water quality factors including the Chlorophyll-a, the turbidity level, the pH, the water temperature, the pressure and the flow amount of the raw water of the raw water storage reservoir; a coagulant injection controller for estimating the membrane pollution state by using the raw water quality factors measured by the on-line measurer, and controlling the coagulant injection amount according to a reference value of the main water quality factor affecting the membrane filtration resistance, among the raw water quality factors; and a coagulant injector for injecting coagulants into the flash mixer under the control of the coagulant injection controller.

The reference value of the main water quality factor may be Temperature 5° C., Turbidity Level≥25 NTU, or Alga Population Number≥10,000 cnt/mL.

The pressurized micro-filter may further include: a measurement sensor for measuring the number of particles of treated water, the turbidity level of treated water, the flow amount, and the transmembrane voltage of the pressurized micro-filter; a chemical cleaning controller for calculating the pressurized membrane-filtration cleaning efficiency on the basis of the values measured by the measurement sensor and controlling the pressurized micro-filter to be chemically cleaned if the membrane-filtration cleaning efficiency is lower than a predetermined value; and a chemical cleaner for chemically cleaning the pressurized micro-filter by injecting chemicals into the pressurized micro-filter under the control of the chemical cleaning controller.

The flow channel switch unit may include: a first electronic valve installed in the first pipe and opened/closed under the control of the control panel to supply the backwash wastewater from the backwash wastewater recovery reservoir to the pore-control fiber filter; and a second electronic valve installed in the second pipe and opened/closed under the control of the control panel to return the backwash wastewater from the backwash wastewater recovery reservoir to the front end of the flash mixer.

The control panel may measure the raw water quality factors by the on-line measurer in real time and open the first electronic valve to supply the backwash wastewater from the backwash wastewater recovery reservoir to the pore-control fiber filter, if the temperature, the turbidity level, and the alga population number are higher than predetermined values.

The predetermined values of the temperature, the turbidity level, and the alga population number for the control panel may be Temperature 5° C., Turbidity Level≥25 NTU, and Alga Population Number≥10,000 cnt/mL.

The raw water storage reservoir may be used as a powdered activated carbon contact reservoir.

According to another aspect of the present invention, there is provided a water purification method using the water purification apparatus of claim 1, which uses the pressurized micro-filter preprocessed with the coagulation inclined-plate sedimentation reservoir and the pore-control fiber filter for improvement of a recovery rate, the water purification method including: a micro-floc creating process of creating, by the flash mixer, micro-flocs through electrical neutralization and adsorption by reacting injected coagulants with pollutants contained in the outflow water from the raw water storage reservoir; a floc growing process of growing, by the two-stage coagulation reservoir, the micro-flocs in the outflow water from the flash mixer to flocs with a filterable and sedimentable size; a sedimentation process of sedimenting, by the inclined-plate sedimentation reservoir, the flocks in the outflow water from the two-stage coagulation reservoir and discharging only upper clean water; a primary filtration process of supplying the outflow water from the inclined-plate reservoir to the pressurized micro-filter to discharge membrane-filtration produced water and return circulating water to the front end of the flash mixer; a secondary filtration process of supplying the backwash wastewater to the pore-control fiber filter according to the raw water quality factor of the raw water storage reservoir and filtering/returning the same to the flash mixer or directly returning the same to the flash mixer; and a sludge discharging process of discharging the backwash wastewater from the pore-control fiber filter and the discharge sludge from the inclined-plate sedimentation reservoir.

The water purification method may monitor each of the processes in real time.

The secondary filtration process may measure the raw water quality factors in real time and supply the backwash wastewater from the backwash wastewater recovery reservoir to the pore-control fiber filter, if the temperature, the turbidity level, and the alga population number are higher than predetermined values.

The predetermined values of the temperature, the turbidity level, and the alga population number for the secondary filtration process may be Temperature 5° C., Turbidity Level≥25 NTU, and Alga Population Number≥10,000 cnt/mL.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In the following description, detailed descriptions of well-known functions or configurations will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

Hereinafter, the configurations of a water purification apparatus that uses a pressurized micro-filter preprocessed with a coagulation inclined-plate sedimentation reservoir and a pore-control fiber filter for improvement of a recovery rate, according to an exemplary embodiment of the present invention, will be described in detail with reference to the accompanying drawings.

Figure 1:
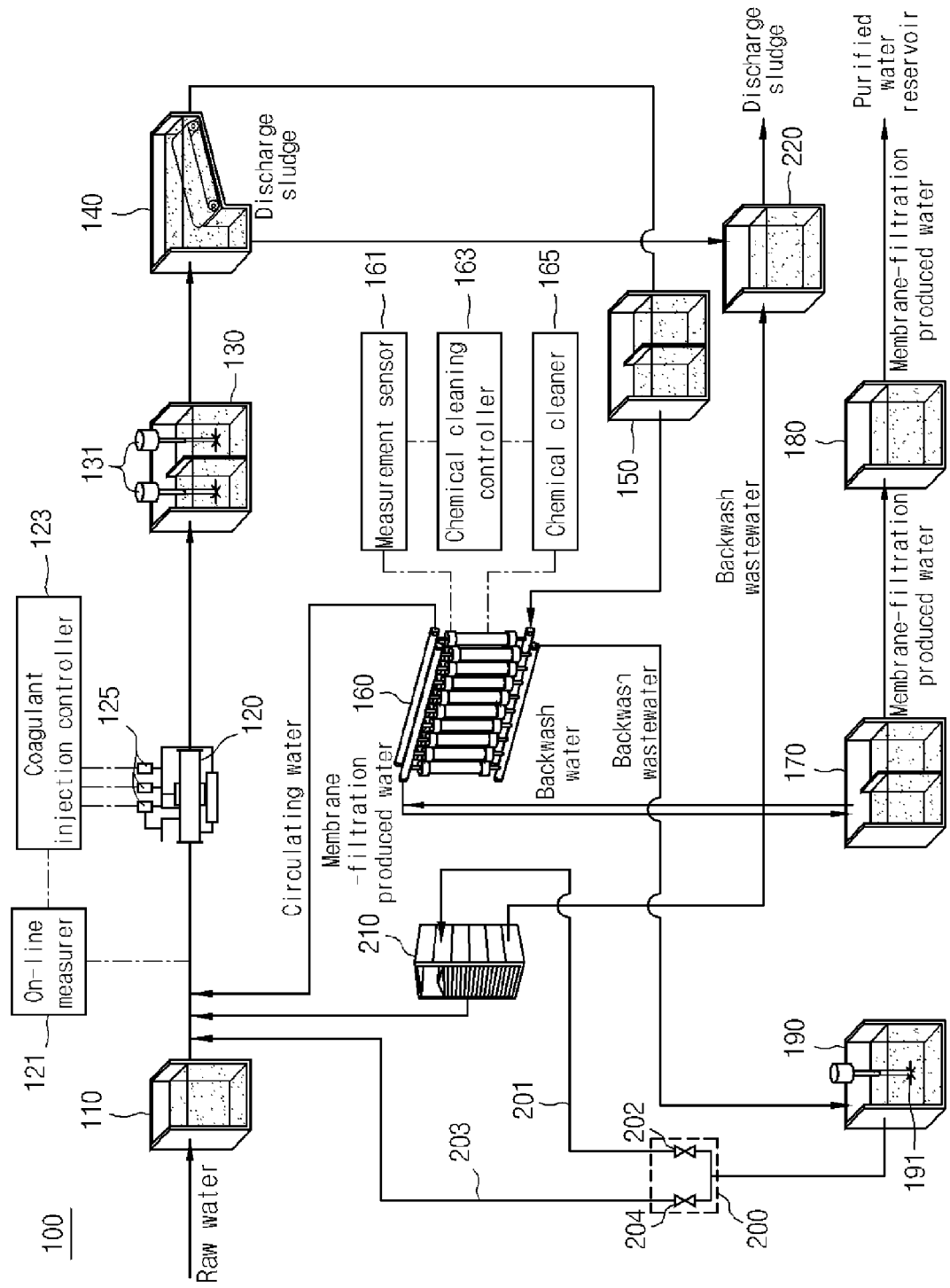
FIG. 1 is a system diagram illustrating the configuration of a water purification apparatus that uses a pressurized micro-filter preprocessed with a coagulation inclined-plate sedimentation reservoir and a pore-control fiber filter for improvement of a recovery rate according to an exemplary embodiment of the present invention.
Figure 2:
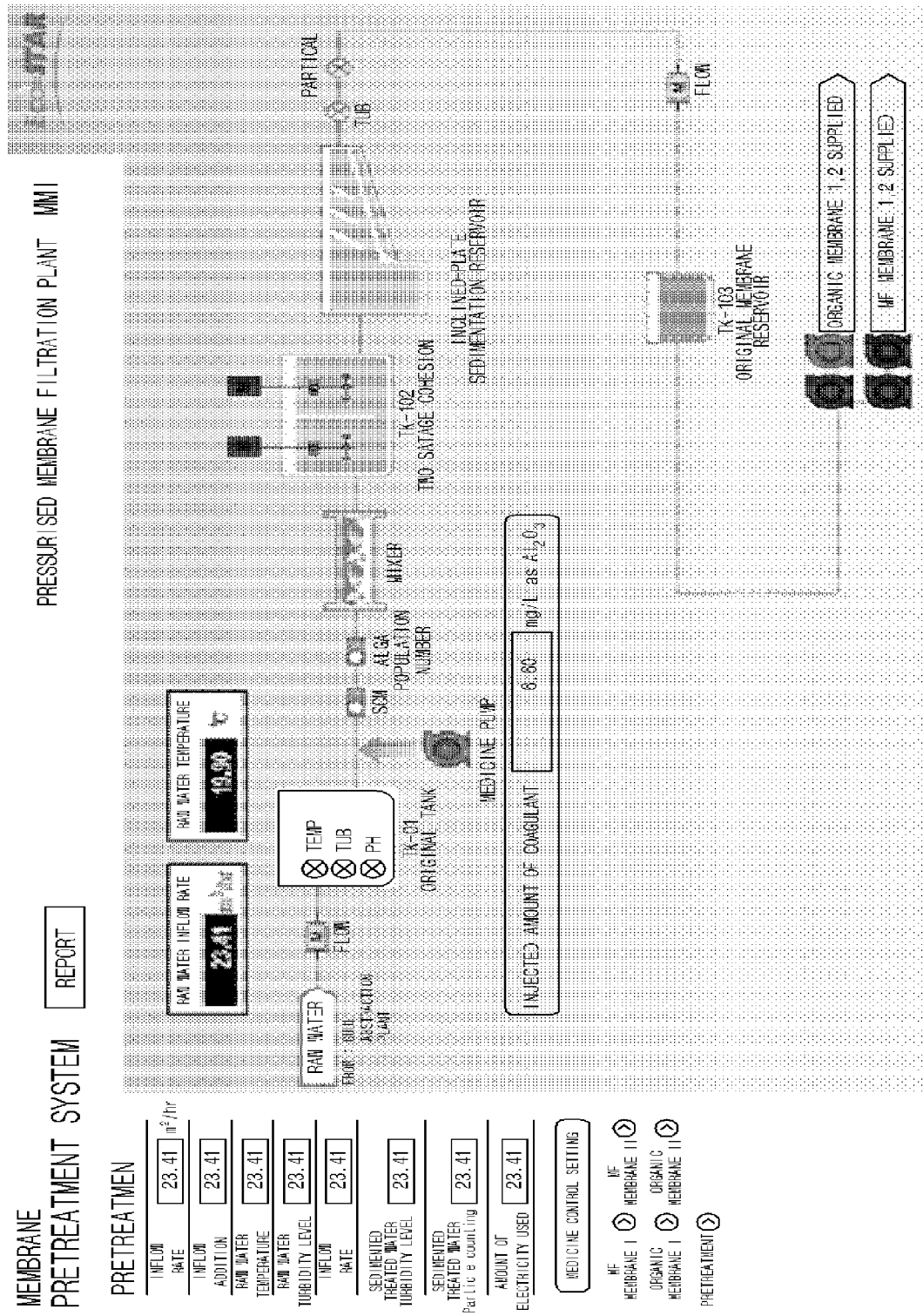
FIGS. 2 and 3 are diagrams illustrating the monitoring states of a water purification apparatus that uses a pressurized micro-filter preprocessed with a coagulation inclined-plate sedimentation reservoir and a pore-control fiber filter for improvement of a recovery rate according to an exemplary embodiment of the present invention.
Figure 3:
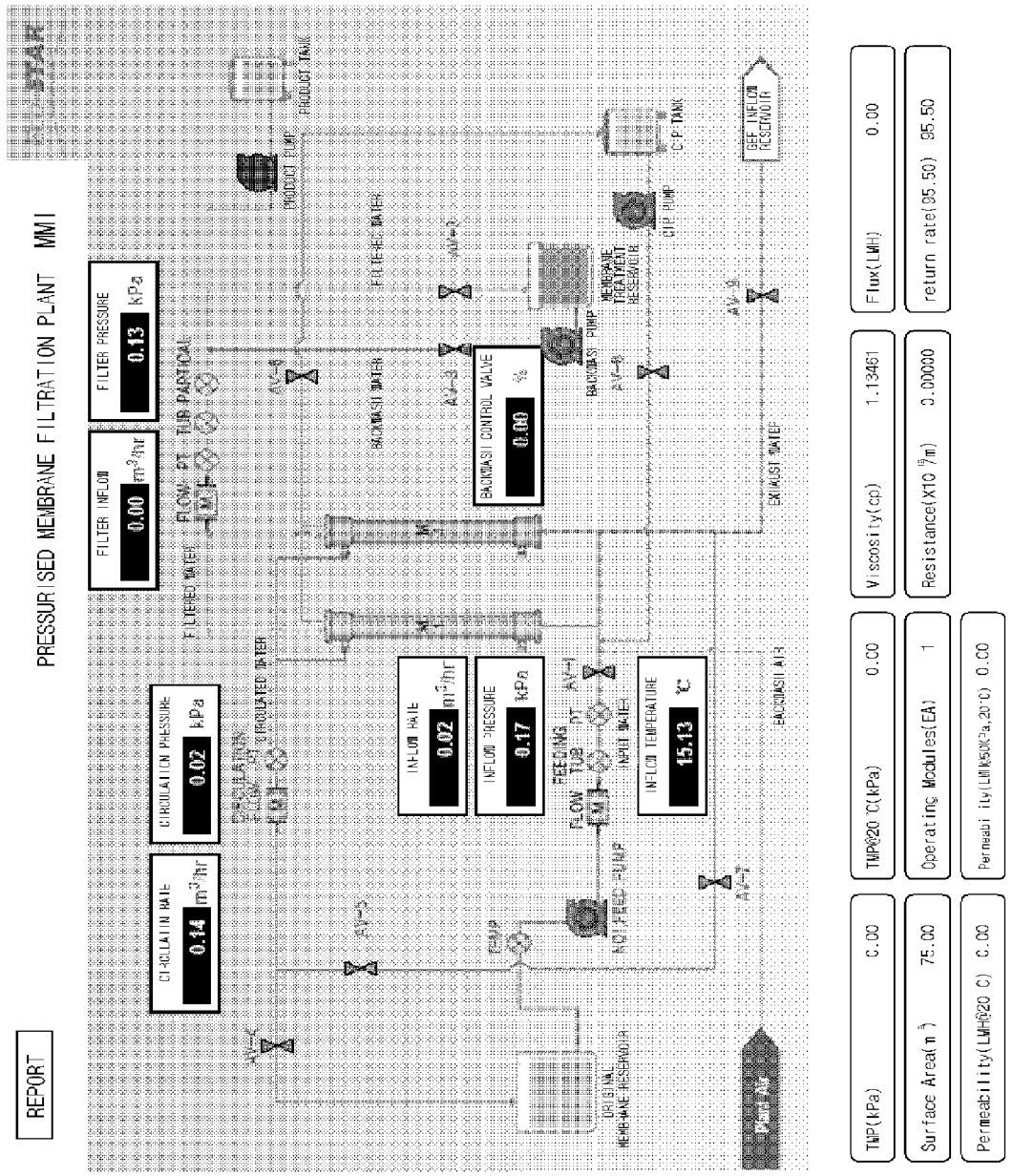

FIG. 1 is a system diagram illustrating the configuration of a water purification apparatus that uses a pressurized micro-filter preprocessed with a coagulation inclined-plate sedimentation reservoir and a pore-control fiber filter for improvement of a recovery rate according to an exemplary embodiment of the present invention. FIGS. 2 and 3 are diagrams illustrating the monitoring states of a water purification apparatus that uses a pressurized micro-filter preprocessed with a coagulation inclined-plate sedimentation reservoir and a pore-control fiber filter for improvement of a recovery rate according to an exemplary embodiment of the present invention.

Referring to FIGS. 1 to 3, a water purification apparatus 100 according to an exemplary embodiment of the present invention, which uses a pressurized micro-filter preprocessed with a coagulation inclined-plate sedimentation reservoir and a pore-control fiber filter for improvement of a recovery rate, includes a raw water storage reservoir 110, a flash mixer 120, a two-stage coagulation reservoir 130, an inclined-plate sedimentation reservoir 140, a membrane-filtration inflow raw water reservoir 150, a pressurized micro-filter 160, a backwash water reservoir 170, a processing reservoir 180, a backwash wastewater recovery reservoir 190, a flow channel switch unit 200, a pore-control fiber filter 210, a discharge sludge wastewater reservoir 220, and a control panel 230.

The raw water storage reservoir 110 stabilizes a water level change of inflow raw water and controls a raw water amount to facilitate a series of water treatment operations such as coagulation, injection, sedimentation and filtration that will be performed in the subsequent process. Herein, the raw water storage reservoir 110 may also be used as a powdered activated carbon contact reservoir to remove taste/odor-causing materials (e.g., 2-MIB and Geosmin), synthetic detergents, phenols, trihalomethanes and precursor materials thereof, chemical materials, and other organic materials, which are not removed through typical water purification processes such as coagulation, sedimentation, filtration, ozonization, and chlorine disinfection. Also, the raw water storage reservoir 110 may improve the coagulation efficiency by injecting alkaline aids or coagulant aids in the event of high water turbidity, and may receive membrane-filtration backwash water or treated wastewater.

The flash mixer 120 creates micro-flocs through electrical neutralization and adsorption by rapidly reacting injected coagulants with pollutants contained in outflow water that naturally flows down from the raw water storage reservoir 110.

The flash mixer 120 includes: an on-line measurer 121 for measuring in real time the raw water quality factors including the Chlorophyll-a, the turbidity level, the pH, the water temperature, the pressure and the flow amount of the raw water of the raw water storage reservoir 110; a coagulant injection controller 123 for estimating the membrane pollution state by using the raw water quality factors measured by the on-line measurer 121 and controlling the coagulant injection amount according to a reference value of the main water quality factor affecting the membrane filtration resistance, among the raw water quality factors; and a coagulant injector 125 for injecting coagulants into the flash mixer 120 under the control of the coagulant injection controller 123. Herein, the reference value of the main water quality factor may be Temperature 5° C., Turbidity Level≥25 NTU, or Alga Population Number≥10,000 cnt/mL.

The two-stage coagulation reservoir 130 includes a first agitator 131 for growing micro-flocs in outflow water, which naturally flows down from the flash mixer 120, to flocs with a filterable and sedimentable size. The two-stage coagulation reservoir 130 reduces the occupation area by reducing conventional three-stage coagulation to two-stage coagulation, and may correspond in the membrane filtration through the sedimentation reservoir even without forming excessively large flocs with respect to the raw water with a low turbidity level (equal to or lower than 10 NTU).

The inclined-plate sedimentation reservoir 140 is equipped with a fin inclined plate for separation by surface loading and separation by turbulence, to sediment outflow water that naturally flows down from the two-stage coagulation reservoir 130, and to discharge only upper clean water.

The membrane-filtration inflow raw water reservoir 150 maintains the constant outflow water amount by stabilizing the water level of outflow water that naturally flows down from the inclined-plate sedimentation reservoir 140.

The pressurized micro-filter 160 receives/filters outflow water from the membrane inflow raw water reservoir 150, discharges membrane-filtration produced water, and returns circulating water to the front end of the flash mixer 120. The pressurized micro-filter 160 includes: a measurement sensor 161 for measuring the number of particles of treated water, the turbidity level of treated water, the flow amount, and the transmembrane voltage of the pressurized micro-filter 160; a chemical cleaning controller 163 for calculating the pressurized membrane-filtration cleaning efficiency on the basis of the values measured by the measurement sensor 161 and controlling the pressurized micro-filter 160 to be chemically cleaned if the membrane-filtration cleaning efficiency is lower than a predetermined value; and a chemical cleaner 165 for chemically cleaning the pressurized micro-filter 160 by injecting chemicals into the pressurized micro-filter 160 under the control of the chemical cleaning controller 163. Herein, the pressurized micro-filter 160 uses a micro filter membrane to remove algae, protozoans and microparticles, which fail to be removed by the sedimentation reservoir, through a sieving phenomenon. In an exemplary embodiment, the micro filter membrane may be a hollow fiber-type pressurized micro-filter, and the separation membrane filtration may be outside-in filtration that pressurizes inflow raw water to perform filtration from the outside to the inside. Also, a pump and a valve (not illustrated) are installed at the front end of the pressurized micro-filter 160. This is well known in the art and thus a detailed description thereof will be omitted for conciseness.

The backwash water reservoir 170 maintains the outflow water amount by stabilizing the water level of membrane-filtration produced water discharged from the pressurized micro-filter 160, and provides backwash water to the pressurized micro-filter 160.

The processing reservoir 180 discharges membrane-filtration produced water to a clear well (not illustrated) of a water purification plant while maintaining the outflow water amount by stabilizing the water level of outflow water from the backwash water reservoir 170.

The backwash wastewater recovery reservoir 190 recovers backwash wastewater discharged from the pressurized micro-filter 160 and includes a second agitator 191 to prevent the sedimentation of sludge contained in the backwash water.

The flow channel switch unit 200 selectively supplies the backwash water of the backwash wastewater recovery reservoir 190 through first and second pipes 201 and 203 under the control of the control panel 230, which will be described later. The flow channel switch unit 200 includes: a first electronic valve 202 installed in the first pipe 201 and opened/closed under the control of the control panel 230 to supply the backwash wastewater from the backwash wastewater recovery reservoir 190 to the pore-control fiber filter 210; and a second electronic valve 204 installed in the second pipe 203 and opened/closed under the control of the control panel 230 to return the backwash wastewater from the backwash wastewater recovery reservoir 190 to the front end of the flash mixer 120. This configuration of the installation of pumps on the first and second pipes 201 and 203 is well known in the art and thus a detailed description thereof will be omitted for conciseness.

The pore-control fiber filter 210 receives the backwash wastewater from the backwash wastewater recovery reservoir 190 through the first pipe 201 of the flow channel switch unit 200, filters the same, and returns the fiber-filtration water to the front end of the flash mixer 120.

The discharge sludge wastewater reservoir 220 discharges the backwash wastewater from the pore-control fiber filter 210 and the discharge sludge from the inclined-plate sedimentation reservoir 140.

The control panel 230 controls the flow channel switch unit 200 according to the raw water quality factor of the raw water storage reservoir 110 to supply the outflow water of the backwash wastewater recovery reservoir 190 to the pore-control fiber filter 210 or to return the same to the raw water storage reservoir 110, and monitors the coagulant injection amount into the flash mixer 120, the agitation intensity of the first agitator 131 of the two-stage coagulation reservoir 130, and the agitation intensity of the second agitator of the backwash wastewater recovery reservoir 190, the chemical injection amount, and the operation state of the pressurized micro-filter 160, as illustrated in FIGS. 2 and 3. The control panel 230 measures the raw water quality factors from the on-line measurer 121 in real time and, and opens the first electronic valve 202 to supply the backwash wastewater from the backwash wastewater recovery reservoir 190 to the pore-control fiber filter 210, if the temperature, the turbidity level, and the alga population number are higher than predetermined values. Herein, the temperature, the turbidity level, and the alga population number may be Temperature 5° C., Turbidity Level≥25 NTU, and Alga Population Number≥10,000 cnt/mL. Also, the control panel 230 measures the raw water quality factors from the on-line measurer 121 in real time and, and opens the second electronic valve 204 to directly return the backwash wastewater from the backwash wastewater recovery reservoir 190 to the front end of the flash filter 120, if the temperature, the turbidity level, and the alga population number are lower than the predetermined values.

Hereinafter, a water purification apparatus that uses a pressurized micro-filter preprocessed with a coagulation inclined-plate sedimentation reservoir and a pore-control fiber filter for improvement of a recovery rate, according to an exemplary embodiment of the present invention, will be described in detail with reference to the accompanying drawings.

Figure 4:
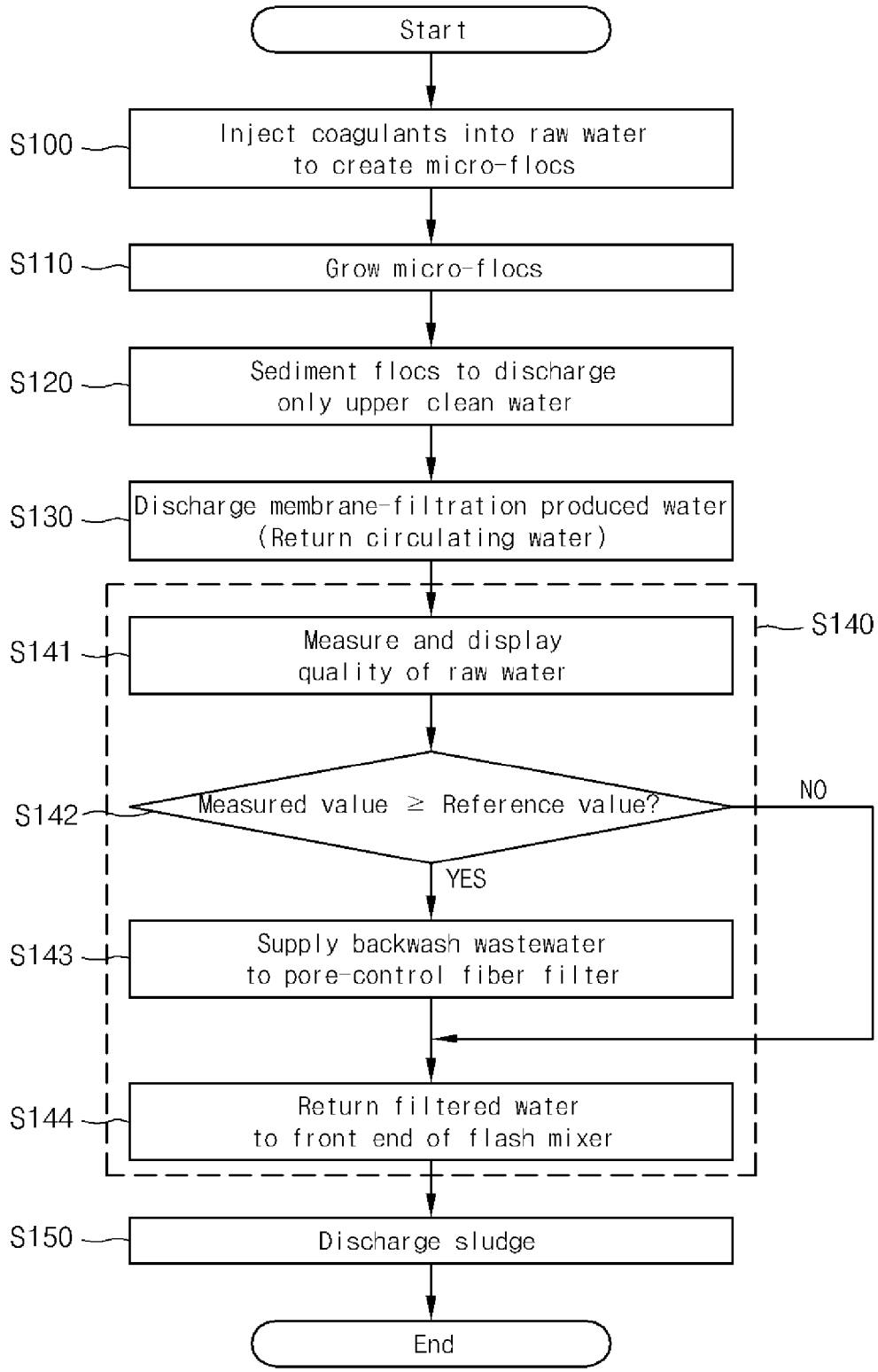
FIG. 4 is a flow chart illustrating a water purification method that uses a pressurized micro-filter preprocessed with a coagulation inclined-plate sedimentation reservoir and a pore-control fiber filter for improvement of a recovery rate according to an exemplary embodiment of the present invention.

FIG. 4 is a flow chart illustrating a water purification method that uses a pressurized micro-filter preprocessed with a coagulation inclined-plate sedimentation reservoir and a pore-control fiber filter for improvement of a recovery rate according to an exemplary embodiment of the present invention.

First, when outflow water is supplied from the raw water storage reservoir 110 to the flash mixer 120, the flash mixer 120 creates micro-flocs through electrical neutralization and adsorption by reacting injected coagulants with pollutants contained in the outflow water (S100). At this point, the coagulant injection controller 123 estimates the membrane pollution state by using the raw water quality factors (e.g., flow amount, pressure, water temperature, pH, turbidity level, and Chlorophyll-a) measured by the on-line measurer 121 and controls the coagulant injection amount according to a reference value of the main water quality factor affecting the membrane filtration resistance, among the raw water quality factors. Also, the coagulant injection controller 123 transfers the measurement values of the raw water quality factors and the coagulant injection amount to the control panel 230, and the control panel 230 displays the measurement values of the raw water quality factors and the coagulant injection amount through a monitor in real time.

Then, when outflow water is supplied form the flash mixer 120 to the two-stage coagulation reservoir 130, the two-stage coagulation reservoir 130 grows micro-flocs in the outflow water to flocs with a filterable and sedimentable size (S110). At this point, the agitation intensity (i.e., the rotation speed) of the first agitator 131 of the two-stage coagulation reservoir 130 is transferred to the control panel 230, and the control panel 230 displays the agitation intensity through the monitor in real time.

Thereafter, when the outflow water containing the grown flocs is supplied from the two-stage coagulation reservoir 130 to the inclined-plate sedimentation reservoir 140, the inclined-plate sedimentation reservoir 140 sediments the flocs contained in the outflow water and discharges only upper clean water (S120). The upper clean water flows into the membrane-filtration inflow raw water reservoir 150 to maintain the constant outflow water amount.

When outflow water is supplied from the membrane-filtration inflow raw water reservoir 150 to the pressurized micro-filter 160, the pressurized micro-filter 160 discharges membrane-filtration produced water and returns circulating water to the front end of the flash mixer 120 (S130). At this point, the chemical cleaning controller 163 calculates the pressurized membrane-filtration cleaning efficiency on the basis of the measurement values (the transmembrane voltage, the flow amount, the turbidity level of treated water, and the number of particles in treated water) of the measurement sensor 161. If the membrane-filtration cleaning efficiency is lower than a predetermined value, the chemical cleaning controller 163 stops the discharge of the membrane-filtration produced water, performs backwashing, chemically cleans the pressurized micro-filter 160 through the chemical cleaner 165, and again discharges the membrane-filtration produced water. Also, the backwash wastewater of the pressurized micro-filter 160 is recovered by the backwash wastewater recovery reservoir 190. At this point, the agitation intensity (i.e., the rotation speed) of the second agitator 191 of the backwash wastewater recovery reservoir 190 is transferred to the control panel 230, and the control panel 230 displays the agitation intensity through the monitor in real time.

Then, the control panel 230 displays the raw water quality factors measured by the on-line measurer 121 in real time (S141) and compares the measured temperature, turbidity level, population number of algae with predetermined values (S142). If the measurement values are higher than the predetermined values, the control panel 230 opens the first electronic valve 202 to supply the backwash wastewater of the backwash wastewater recovery reservoir 190 to the pore-control fiber filter 210 and return the filtered water to the front end of the flash mixer 120 (S143). On the other hand, if the temperature, the turbidity level, and the population number of algae are lower than the predetermined values (Temperature 5° C., Turbidity Level≥25 NTU, and Alga Population Number≥10,000 cnt/mL), the control panel 230 opens the second electronic valve 204 to return the backwash wastewater of the backwash wastewater recovery reservoir 190 to the front end of the flash mixer 120 (S144).

Meanwhile, the backwash wastewater from the pore-control fiber filter 210 and the discharge sludge from the inclined-plated sedimentation reservoir 140 are supplied to the discharge sludge wastewater reservoir 220, and they are discharged from the discharge sludge wastewater reservoir 220 (S150).

As described above, the water purification apparatus and method using the pressurized micro-filter and the pore-control fiber filter according to the present invention can reduce the chemical consumption rate and the sludge by-product generation amount by the preprocessing device including the mixed-two stage coagulation-inclined plate sedimentation reservoir.

Also, in comparison with the coagulation injection based determination by Jar-Test or a chemical injection rate lookup table in the conventional standard water purification process, the present invention increase the coagulation efficiency and reduce the coagulation injection amount by controlling the coagulant injection amount by means of an accurate, effective and continuous water quality monitoring device.

Also, in comparison with the conventional sand filtration method, the present invention can secure the reliability of running water and can reduce the disinfection by-products through the use of a small amount of chlorine in the subsequent disinfection process by completely removing microorganisms with strong disinfection resistance, such as alga, *Cryptosporidium* and *Giardia*, through a variable operation, even in the event of a change in the quality of raw water.

Also, the present invention can preserve water resources by maintaining a more than 99% recovery rate by using the pore-control fiber filter capable of treating the backwash wastewater, and can provide convenience to the operator in the water purification plant by continuously monitoring/controlling the operation states for the membrane filtration process and the membrane-filtration preprocess While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A water purification apparatus that uses a pressurized micro-filter preprocessed with a coagulation inclined-plate sedimentation reservoir and a pore-control fiber filter for improvement of a recovery rate, the water purification apparatus comprising:

a raw water storage reservoir configured to maintain a constant raw water amount by stabilizing the water level of inflow raw water;

a flash mixer configured to create micro-flocs through electrical neutralization and adsorption by rapidly reacting injected coagulants with pollutants contained in outflow water from the raw water storage reservoir;

a two-stage coagulation reservoir comprising a first agitator configured to grow the micro-flocs in the outflow water from the flash mixer to flocs with a filterable and sedimentable size;

an inclined-plate sedimentation reservoir equipped with a fin inclined plate configured to separate by surface loading and by turbulence, to sediment the flocks in the outflow water from the two-stage coagulation reservoir, and to discharge only upper clean water;

a membrane-filtration inflow raw water reservoir configured to maintain a constant outflow water amount by stabilizing the water level of the outflow water from the inclined-plate sedimentation reservoir;

a pressurized micro-filter configured to receive/filter the outflow water from the membrane-filtration inflow raw water reservoir, discharge membrane-filtration produced water, and return circulating water to the front end of the flash mixer;

a backwash water reservoir a configured to maintain an outflow water amount by stabilizing the water level of membrane-filtration produced water from the pressurized micro-filter and provide backwash water to the pressurized micro-filter;

a processing reservoir configured to discharge the membrane-filtration produced water to a clear well of a water purification plant while maintaining the outflow water amount by stabilizing the water level of the outflow water from the backwash water reservoir;

a backwash wastewater recovery reservoir configured to recover the backwash wastewater from the pressurized micro-filter and comprising a second agitator configured to prevent the sedimentation of sludge contained in the backwash water;

a flow channel switch unit configured to selectively supply the backwash water of the backwash wastewater recovery reservoir through first and second pipes according to an external control;

a pore-control fiber filter configured to receive the backwash wastewater from the backwash wastewater recovery reservoir through the first pipe of the flow channel switch unit, filter the same, and return the fiber-filtration water to the front end of the flash mixer;

a discharge sludge wastewater reservoir configured to discharge the backwash wastewater from the pore-control fiber filter and the discharge sludge from the inclined-plate sedimentation reservoir; and a control panel configured to control the flow channel switch unit according to the raw water quality factors of the raw water storage reservoir to supply the outflow water of the backwash wastewater recovery reservoir to the pore-control fiber filter or to return the same to the raw water storage reservoir, and monitor the coagulant injection amount into the flash mixer, the agitation intensity of the first agitator of the two-stage coagulation reservoir, and the agitation intensity of the second agitator of the backwash wastewater recovery reservoir, the chemical injection amount, and the operation state of the pressurized micro-filter, wherein the flash mixer further comprises:
an on-line measurer configured to measure in real time the raw water quality factors including the Chlorophyll-a, the turbidity level, the pH, the water temperature, the pressure, and the flow amount of the raw water of the raw water storage reservoir;

a coagulant injection controller configured to estimate the membrane pollution state by using the raw water quality factors measured by the on-line measurer, and control the coagulant injection amount according to a reference value of the main water quality factor affecting the membrane filtration resistance, among the raw water quality factors; and a coagulant injector configured to inject coagulants into the flash mixer under the control of the coagulant injection controller, wherein the flow channel switch unit comprises:
a first electronic valve installed in the first pipe and configured to be opened/closed under the control of the control panel to supply the backwash wastewater from the backwash wastewater recovery reservoir to the pore-control fiber filter; and a second electronic valve installed in the second pipe and configured to be opened/closed under the control of the control panel to return the backwash wastewater from the backwash wastewater recovery reservoir to the front end of the flash mixer, and wherein the control panel is configured to measure the raw water quality factors by the on-line measurer in real time, and open the first electronic valve to supply the backwash wastewater from the backwash wastewater recovery reservoir to the pore-control fiber filter, if the temperature, the turbidity level, and the alga population number are higher than predetermined values.

2. The water purification apparatus of claim 1, wherein the reference value of the main water quality factor is Temperature 5° C., Turbidity Level ≥25 NTU, or Alga Population Number ≥10,000cnt/mL.

3. The water purification apparatus of claim 1, wherein the pressurized micro-filter further comprises:
a measurement sensor configured to measure the number of particles of treated water, the turbidity level of treated water, the flow amount, and the transmembrane voltage of the pressurized micr-filter;

a chemical cleaning controller configured to calculate the pressurized membrane-filtration cleaning efficiency on the basis of the values measured by the measurement sensor and control the pressurized micro-filter to be chemically cleaned if the membrane-filtration cleaning efficiency is lower than a predetermined value; and a chemical cleaner configured to chemically clean the pressurized micro-filter by injecting chemicals into the pressurized micro-filter under the control of the chemical cleaning controller.

4. The water purification apparatus of claim 1, wherein the predetermined values of the temperature, the turbidity level, and the alga population number for the control panel are Temperature 5° C., Turbidity Level ≥25 NTU, and Alga Population Number ≥10,000cnt/mL.

5. The water purification apparatus of claim 1, wherein the raw water storage reservoir is used as a powdered activated carbon contact reservoir.

* * * * *